United States Patent
Jeong et al.

(10) Patent No.: US 9,382,137 B2
(45) Date of Patent: Jul. 5, 2016

(54) FLOW PATH CONTROL DEVICE OF TOILET BIDET AND TOILET BIDET HAVING THE SAME

(75) Inventors: Ji-Hye Jeong, Seoul (KR); Soo-Young Lee, Seoul (KR)

(73) Assignee: WOONGJIN COWAY CO., LTD., Choongcheonhnam-Do (KR)

( * ) Notice: Subject to any disclaimer, the term of this patent is extended or adjusted under 35 U.S.C. 154(b) by 897 days.

(21) Appl. No.: 13/145,929

(22) PCT Filed: Mar. 26, 2010

(86) PCT No.: PCT/KR2010/001884
§ 371 (c)(1),
(2), (4) Date: Jul. 22, 2011

(87) PCT Pub. No.: WO2010/110628
PCT Pub. Date: Sep. 30, 2010

(65) Prior Publication Data
US 2012/0005817 A1    Jan. 12, 2012

(30) Foreign Application Priority Data
Mar. 26, 2009 (KR) .................. 10-2009-0025818

(51) Int. Cl.
*E03D 9/08* (2006.01)
*C02F 1/467* (2006.01)
*C02F 103/00* (2006.01)

(52) U.S. Cl.
CPC ............. *C02F 1/4674* (2013.01); *E03D 9/08* (2013.01); *C02F 2103/005* (2013.01)

(58) Field of Classification Search
USPC ................ 4/420.1–420.4, 443, 448
See application file for complete search history.

(56) References Cited

U.S. PATENT DOCUMENTS

| | | | | |
|---|---|---|---|---|
| 4,761,837 A | * | 8/1988 | Takeda | .............................. 4/443 |
| 5,101,520 A | * | 4/1992 | Lockhart | .................. E03D 9/08 |
| | | | | 4/420.4 |

(Continued)

FOREIGN PATENT DOCUMENTS

| CN | 101082228 A | 12/2007 |
|---|---|---|
| CN | 101208483 A | 6/2008 |

(Continued)

OTHER PUBLICATIONS

Japanese Office Action issued on Sep. 17, 2014, in the Japanese Patent Application No. 2012-501943. (No English Translation Provided).

(Continued)

*Primary Examiner* — Lauren Crane
(74) *Attorney, Agent, or Firm* — Dority & Manning, P.A.

(57) ABSTRACT

There are provided a flow path control device of a toilet bidet having a simpler connection structure of tubes and smaller number of connection parts of the tubes, and a toilet bidet including the flow path control device. The flow path control device of a toilet bidet, includes: a first housing including two or more demarcated chambers; a first flow path control unit disposed at the interior of the first housing and opening one of the two or more chambers to allow water to be introduced into the chamber; an air mixing unit connected with one of the chambers of the first housing and mixing air with water introduced into the chamber as the chamber is opened by an air pressure; a second housing including three or more compartments connected with the chamber to which the air mixing unit is connected, receiving water containing air, and connected with a bidet nozzle and a cleansing nozzle; and a second flow path control unit disposed within the interior of the second housing and opening some of the three or more compartments to allow water to flow thereinto.

9 Claims, 7 Drawing Sheets

(56) References Cited

U.S. PATENT DOCUMENTS

| | | | |
|---|---|---|---|
| 5,380,275 A | * | 1/1995 | Kensey et al. .................. 604/27 |
| 5,970,528 A | * | 10/1999 | Shirai et al. .................... 4/420.2 |
| 2008/0201837 A1 | | 8/2008 | Oh |

FOREIGN PATENT DOCUMENTS

| | | |
|---|---|---|
| JP | 01318623 A | 12/1989 |
| JP | 05-156688 A | 6/1993 |
| JP | 2009-034593 A | 2/1999 |
| JP | 11-336164 A | 7/1999 |
| JP | 2000-220193 A | 8/2000 |
| JP | 2001-090149 A | 4/2001 |
| JP | 2004-116151 A | 4/2004 |
| JP | 2005-290696 A | 10/2005 |
| JP | 2008-255769 A | 10/2008 |
| KR | 10-20030077483 | 10/2003 |
| KR | 20-0401806 | 11/2005 |

OTHER PUBLICATIONS

PCT Search Report and Written Opinion for PCT/KR2010/001884, dated Oct. 28, 2010.

* cited by examiner

FLOW PATH CONTROL DEVICE OF TOILET BIDET AND TOILET BIDET HAVING THE SAME

TECHNICAL FIELD

The present invention relates to a flow path control device of a toilet bidet and a toilet bidet having the same.

BACKGROUND ART

In general, a toilet (i.e., a toilet bowl, a chamber pot, etc.) is a piece of equipment allowing a user to be seated to pass a bowl movement. The toilet may be equipped with a bidet to make using a restroom convenient and for a sanitary purpose.

A nozzle assembly is installed to dispense water to cleanse the private parts of a user after the user relieves himself. The nozzle assembly includes a cleansing nozzle, a bidet nozzle installed to be protracted and retracted to spray cleansing water and a nozzle tip cleansing unit cleansing the outer sides of the nozzle tips of the cleansing nozzle and the bidet nozzle.

Also, a flow path control device is installed in the bidet to control flow paths supplied to the cleansing nozzle, the bidet nozzle, and the nozzle tip cleansing unit. The flow path control device may include a two-way valve and a four-way valve.

The two-way valve is connected with a tube connected with the nozzle tip cleansing unit and a tube connected with the four-way valve. Also, the four-way valve is connected with tubes connected with the cleansing nozzle and the bidet nozzle.

An air injection pipe for injecting air into a water current (i.e., water stream) is connected with the tubes connecting the two-way valve and the four-way valve, and an air pump for pumping air is connected with the air injection pipe.

A sterilization module for supplying sterilization water to the toilet and the nozzle tip cleansing unit is installed in the bidet to sterilize the toilet. The sterilization module is connected with the toilet and the nozzle tip cleansing unit by a tube.

However, in the related art, when the toilet and the nozzle tip are cleansed, the same water is supplied to the sterilization module, so an almost equal amount of sterilization material is generated from the sterilization module when the toilet and the nozzle tip are sterilized. Thus, sterilizing the toilet requires a large amount of sterilization material, making it difficult to sufficiently sterilize the toilet.

In addition, in the flow path control device, an air tube is connected with the tube between the two-way valve and the four-way valve, so as the pressure of water flowing along the tube is high, a mixture rate of air is low.

Also, an installation structure including ribs or fastening holes for installing the two-way valve or the four-way valve within the bidet is complicated. Furthermore, because the structure of a mold for fabricating the bidet is complicated, the fabrication unit cost of the bidet increases.

DISCLOSURE OF INVENTION

Technical Problem

An aspect of the present invention provides a flow path control device of a toilet bidet having a simpler connection structure of tubes and smaller number of tube connection parts.

An aspect of the present invention also provides a flow path control device of a toilet bidet capable of significantly reducing the time required for recognizing connection positions of the respective tubes when the flow path control device is broken down and considerably shortening the time required for re-assembling the respective tubes.

An aspect of the present invention also provides a toilet bidet capable of generating a sterilization material as much as required for sterilizing the toilet and a nozzle tip when the toilet and the nozzle tip are sterilized.

An aspect of the present invention also provides a toilet bidet having a simpler tube connection structure and a smaller number of tube connection parts.

An aspect of the present invention also provides a toilet bidet capable of significantly reducing the time required for recognizing the connection positions of the respective tubes when a flow path control device is broken down and considerably shortening the time required for re-assembling the respective tubes.

An aspect of the present invention also provides a toilet bidet capable of reducing the probability of the generation of a water leakage and facilitating the detection of the cause of water leakage.

An aspect of the present invention also provides a toilet bidet capable of increasing a mixture rate of air.

Solution to Problem

According to an aspect of the present invention, there is provided a flow path control device of a toilet bidet, including: a first housing including two or more demarcated chambers; a first flow path control unit disposed at the interior of the first housing and opening one of the two or more chambers to allow water to be introduced into the chamber; a second housing connected with one of the chambers of the first housing, and including three or more compartments connected with a bidet nozzle and a cleansing nozzle; and a second flow path control unit disposed at the interior of the second housing and opening some of the three or more compartments to allow water to flow thereinto.

According to another aspect of the present invention, there is provided a toilet bidet including: a flow path control as described above; a sterilization water module providing sterilization water; a connection pipe connected with a discharge side flow path of the flow path control device; a nozzle tip sterilization pipe connected with the connection pipe and the nozzle tip cleansing unit; and a toilet sterilization pipe connected with the connection pipe and a toilet sterilization module, wherein the nozzle tip sterilization pipe and the toilet sterilization pipe are supplied with sterilization water formed by the sterilization water module.

The sterilization water module may be connected with the connection pipe and generates sterilization water by ionizing water discharged from the connection pipe by applying electricity thereto.

The toilet bidet may further include: a reactant adding module connected with the connection pipe and adding a reactant to water flowing to the sterilization water module to allow the sterilization water module to increase the amount of a sterilization material generated.

The reactant may be NaCl or $NaClO_2$ and the reactant may be accommodated in the reactant adding module such that the reactant is exposed to water.

The toilet bidet may further include: a direct water supply pipe connecting the flow path control device and the sterilization water module.

The flow path control device may further comprise an air mixing unit connected with the chamber of the first housing to which the second housing is connected, and mixing air with water introduced into the chamber as the chamber is opened by air pressure;

The air mixing unit may include: a porous member disposed at an air discharge side of an air tube to allow air to pass therethrough.

The porous member may have a form of a sponge or mesh.

The first flow path control unit may include: a first flow path connection member coupled with an inlet side of the first housing and having connection holes formed to correspond to the two or more chambers, respectively; a first flow path opening and closing member rotatably installed at the interior of the first housing and selectively opening and closing one of the connection holes; and a driving motor rotating the first flow path opening and closing member.

The second flow path control unit may include: a second flow path connection member coupled with an inlet side of the second housing and having connection holes formed to correspond to each compartment, respectively; a second flow path opening and closing member rotatably installed at the interior of the second housing and selectively opening and closing some of the connection holes; and a driving motor rotating the second flow path opening and closing member.

Advantageous Effects of Invention

According to the exemplary embodiments of the present invention, the connection structure of tubes can be simplified and the number of tube connection parts can be reduced.

When the flow path control device is broken down, the time required for recognizing the connection positions of the respective tubes can be considerably reduced and the time required for assembling the respective tubes can be also significantly shortened.

The probability of the generation of water leakage can be reduced, and a cause of a water leakage can be easily detected.

The mixture rate of air can be improved, and air bubbles can have a uniform size.

Noise generated when air and water are mixed can be reduced.

A sufficient amount of sterilization material can be generated in order to sterilize the toilet and the nozzle tip.

Because the sterilization material is generated by ionizing the sterilization material, a relatively low voltage, compared with that required for electrolysis, can be used, thus considerably reducing power consumption.

BEST MODE FOR CARRYING OUT THE INVENTION

A flow path control device of a toilet bidet according to exemplary embodiments of the present invention will now be described in detail with reference t the accompanying drawings.

Figure 1:
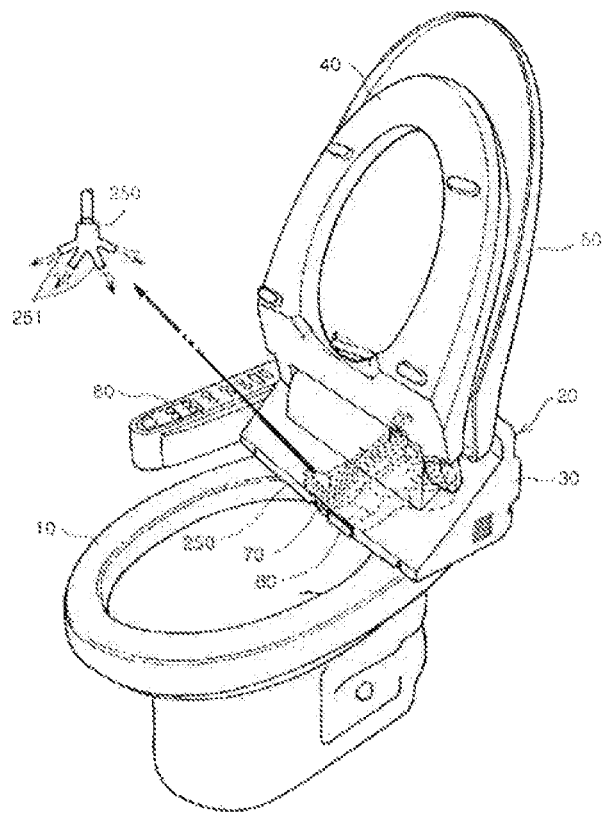
FIG. 1 is a perspective view of a toilet and a toilet bidet according to an exemplary embodiment of the present invention.

FIG. 1 is a perspective view of a toilet and a toilet bidet according to an exemplary embodiment of the present invention.

With reference to FIG. 1, a toilet 10 accommodates water. A toilet bidet 20 is installed at an upper portion of the toilet 10.

The toilet bidet 20 includes a main body 30 mounted on the toilet 10. A bracket (not shown) may be disposed at a lower side of the main body 30 such that it is mounted on a rear upper portion of the toilet 10. The bracket may be detachably coupled at the lower side of the main body 30.

A seat board 40 is rotatably hinge-coupled at a front side of the main body 30. A heater (not shown) is disposed within the interior of the seat board 40 to serve to warm up the seat board 40 so as to have a proper temperature.

A cover 50 is rotatably coupled at an upper portion of the main body. The cover 50 is hinge-coupled at the upper portion of the main body 30.

A drying device 60 may be installed in the interior of the main body 30. The drying device 60 may blow air of room temperature or air of high temperature to the body part.

A nozzle assembly 70 is disposed in the interior of the main body 30. A cleansing nozzle 73 (See FIG. 3) and a bidet nozzle 75 (See FIG. 3) may be reciprocally installed at the nozzle assembly 70. The cleansing nozzle 73 cleanses the anus, and the bidet nozzle 75 cleanses the female genital organ.

A manipulation unit 80 is disposed at one side 145 of the main body 30 in order to control the drying device 60 and the nozzle assembly 70. The manipulation unit 80 includes a plurality of buttons to allow a user to select a certain function. In this case, when the user presses a cleansing button or a bidet button, either the cleansing nozzle 73 or the bidet nozzle 75 of the nozzle assembly 70 moves forward so as to spray cleansing water and thereby cleanse a body part.

A toilet sterilization module 250 is installed in the main body 30 in order to spray sterilization water to the toilet 10. The toilet sterilization module 250 includes a plurality of spray nozzles 251 to inject (or spray) sterilization water in the form of bubbles or droplets.

Figure 2:
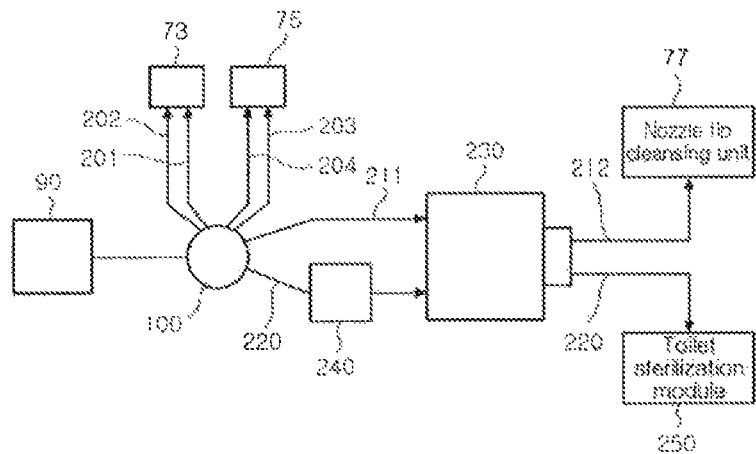
FIG. 2 shows the configuration of a sterilization system constituting the toilet bidet according to a first exemplary embodiment of the present invention.

FIG. 2 shows the configuration of a sterilization system constituting the toilet bidet according to a first exemplary embodiment of the present invention.

With reference to FIG. 2, the main body 10 includes a sterilization system. The sterilization system jets sterilization water to the toilet 10 and the nozzle tips 73b and 75b to sterilize them.

The sterilization system includes a flow path control device 100, a connection pipe 221, a direct water supply pipe 211, a sterilization water module 230, a reactant adding module 240, a nozzle tip sterilization pipe 212, and a toilet sterilization pipe 222.

The flow path control device 100 selectively switches the flow path of supplied water. The flow path control device 100 may be connected with a water supply tank 90 or a water service pipe through piping.

When the flow path control device 100 is connected with the water supply tank 90, a water supply pump (not shown) may be installed at the water supply tank 90 in order to pump water to the flow path control device 100. When the flow path control device 100 is connected with a water service pipe, because water is supplied by water pressure of the water service pipe, there is no need to install a water supply pump.

A plurality of flow path pipes 201, 202, 203, and 204, which are connected with the cleansing nozzle 73 and the bidet nozzle 75 of the nozzle assembly 70, are connected with the flow path control device 100. The flow path control device 100 and a nozzle tip cleansing unit 77 are connected by a nozzle tip sterilization pipe 212, and the flow path control device 100 and the toilet sterilization module 250 are connected by a toilet sterilization pipe 222. The nozzle assembly 70 and the flow path control device 100 will be described in detail later.

The sterilization water module 230 is commonly connected with the discharge sides of the connection pipe 221 and the direct water supply pipe 211. In this case, the flow path control device 100 makes water selectively flow to one of the connection pipe 221 and the direct water supply pipe 211.

The sterilization water module 230 forms sterilization water by ionizing water discharged from the connection pipe 221 and the direct water supply pipe 211. In this case, a voltage of about 5V-25V is applied to an electrode of the sterilization water module, so water can be ionized through the use of a significantly lower voltage as compared with a case in which water is electrolyzed by applying about 100V. In addition, an oxidation-reduction reaction in water does not need a high voltage, for which, thus, a large amount of electrolyte is not required.

Applying electricity to water to generate sterilization water is obvious to the person skilled in the art, so a detailed description thereof will be omitted.

The reactant adding module 240 is connected with the direct water supply pipe 211. The reactant adding module 240 adds a reactant (not shown) to water introduced into the sterilization water module 230 through the direct water supply pipe 211 to increase the amount of generation of a sterilization material in the sterilization water module 230. In this case, a solid NaCl mass or $NaClO_2$ may be applied as the reactant, but the present invention is not limited thereto, and any other salt, rather than NaCl and $NaClO_2$, may be used as the reactant to be put into the reactant adding module.

In this case, the reactant may be accommodated within the reaction such that it is exposed to the introduced water. The reactant is mixed in the water which has been introduced to the interior of the reactant adding module 240 and then introduced into the sterilization water module 230. Then, the sterilization water module 230 applies electricity to the NaCl-mixed water to generate an $OCl$-ion, a sterilization material.

The sterilization water module 230 and the nozzle tip cleansing unit 77 are connected by the nozzle tip sterilization pipe 212, and the sterilization water module 230 and the toilet sterilization module 250 are connected by the toilet sterilization pipe 222.

Figure 3:
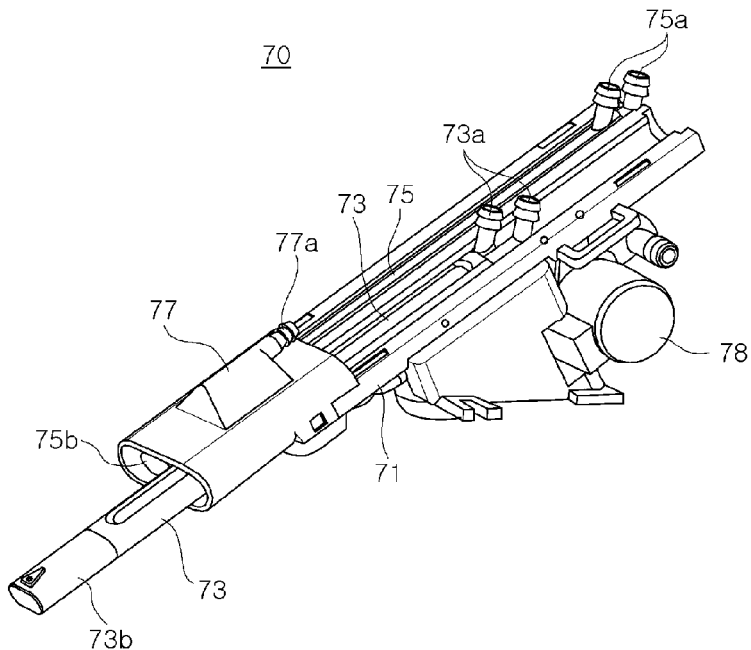
FIG. 3 is a perspective view of a nozzle assembly of the toilet bidet of FIG. 1.

FIG. 3 is a perspective view of a nozzle assembly of the toilet bidet of FIG. 1.

With reference to FIG. 3, the nozzle assembly 70 includes a plate 71 disposed at the interior of the main body 30, the cleansing nozzle 73 and the bidet nozzle 75 reciprocally coupled to the plate 71, the nozzle tip cleansing unit 77 disposed at an upper side of the nozzles 73 and 75 such that it can jet water to the nozzle tips 73b and 75b of the cleansing nozzle 73 and the bidet nozzle 75, and a nozzle driving device 78 for reciprocally moving the cleansing nozzle 73 and the bidet nozzle 75 forward and backward.

The nozzle tips 73b and 75b may be detachably coupled with the ends of the cleansing nozzle 73 and the bidet nozzle 75.

A pair of water inlets 73a and 75a may be formed at the cleansing nozzle 73 and the bidet nozzle 75, respectively, and a single water inlet 77a may be formed at the nozzle tip cleansing unit 77.

A linear flow path (not shown) and a wide flow path (not shown) are formed at the cleansing nozzle 73 and the bidet nozzle 75. Here, the linear flow path is a flow path allowing a corresponding nozzle to inject or spray a water current linearly, and the wide flow path is a flow path allowing a corresponding nozzle to inject or spray a water current such that the water current spreads at a certain angle. In this case, a jet angle of water from the wide flow path can be adjusted by pressing a water pressure to the water flowing along the linear flow path.

One water inlet 73a of the cleansing nozzle 73 is connected with the linear flow path, and the other water inlet 73a is connected with the wide flow path. Also, one water inlet 75a of the bidet nozzle 75 is connected with the linear flow path, and the other water inlet 75a is connected with the wide flow path.

A pair of flow path pipes 201 and 202 (See FIG. 2) connected with the flow path control device 100 may be connected with the pair of water inlets 73a of the cleansing nozzle 73. The other pair of flow path pipes 203 and 204 (See FIG. 2) connected with the flow path control device 100 may be connected with the pair of water inlets 75a of the bidet nozzle 75. Accordingly, the flow path control device 100 can selectively supply water to the linear flow path and the wide flow path of the cleansing nozzle 73 and the bidet nozzle 75.

Figure 4:
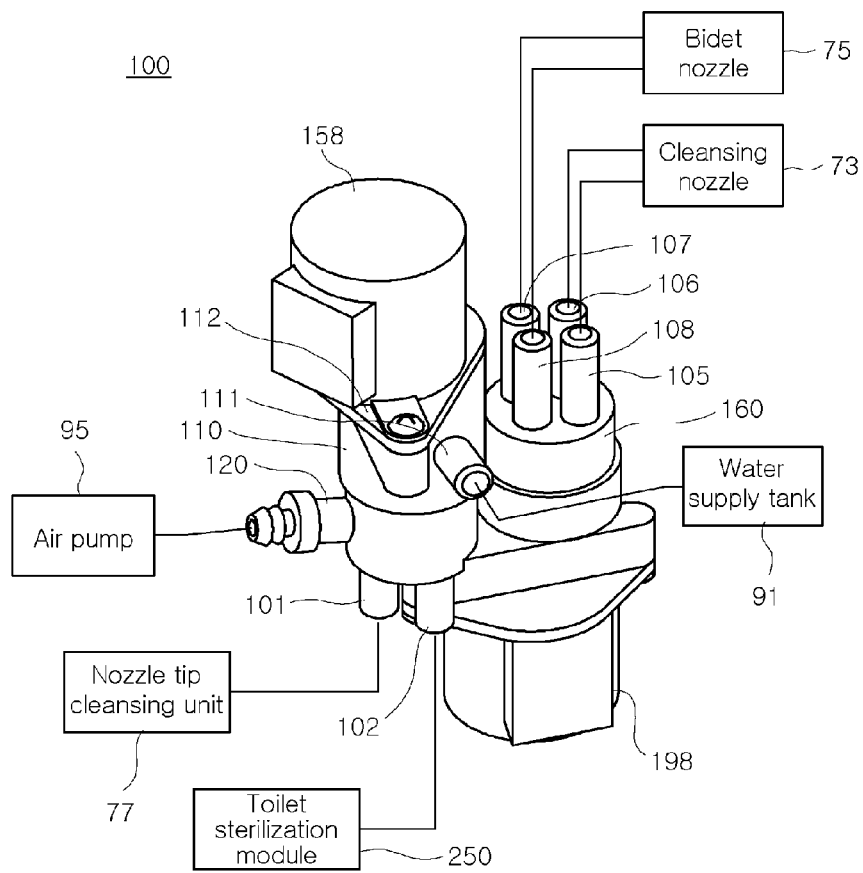
FIG. 4 is a perspective view of a flow path control device of the toilet bidet of FIG. 1.
Figure 5:
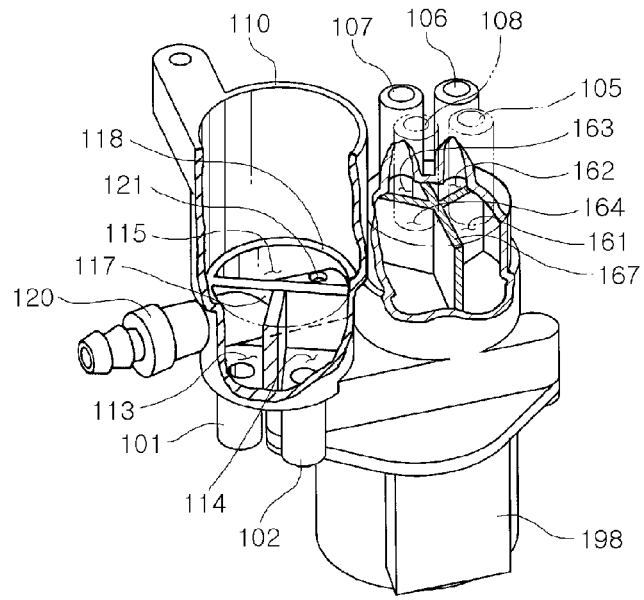
FIG. 5 is a partially cut-away perspective view illustrating an inner structure of the flow path control device of FIG. 4.

FIG. 4 is a perspective view of a flow path control device of the toilet bidet of FIG. 1, and FIG. 5 is a partially cut-away perspective view illustrating an inner structure of the flow path control device of FIG. 4.

Figure 6:
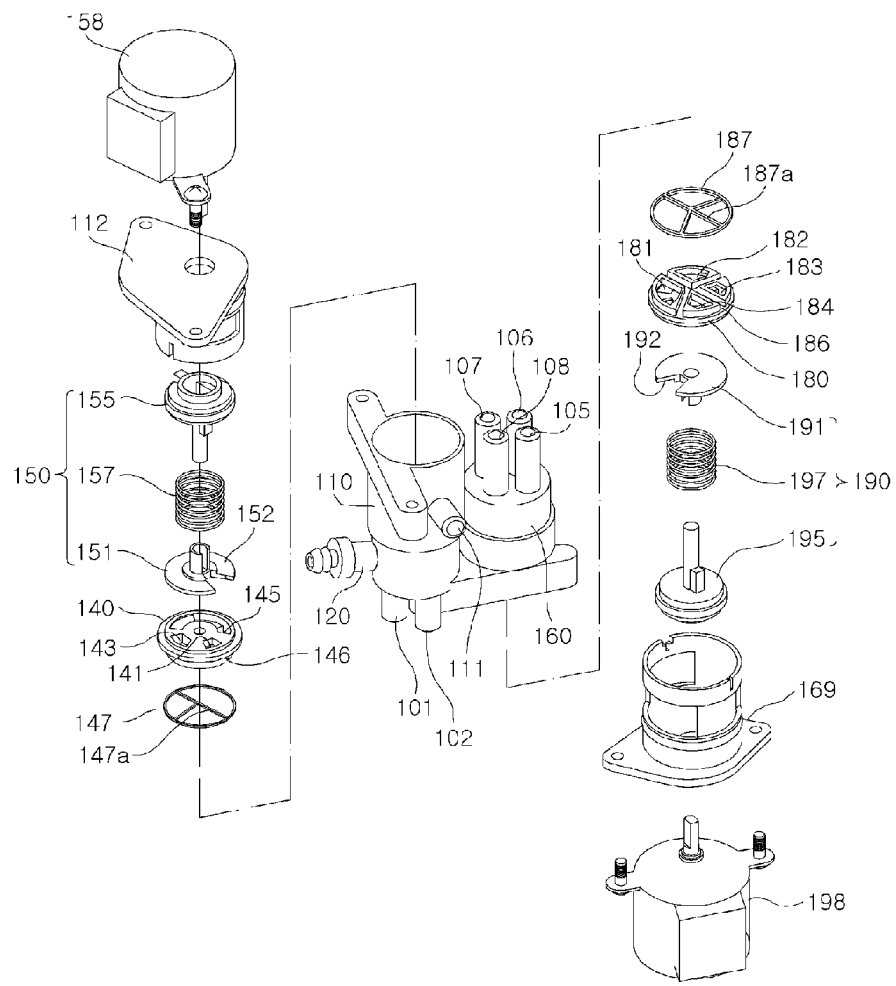
FIG. 6 is an exploded perspective view of the flow path control device of FIG. 4.

With reference to FIGS. 4 and 5, the flow path control device 100 includes a first housing 110, a first flow path control unit 130 (See FIG. 6), a second housing 160, and a second flow path control unit 170 (See FIG. 6). Hereinafter, the first and second housings 110 and 160 will be first described, and the first and second control units 130 and 170 will then be described.

The first housing 110 may have a cylindrical shape. A water supply connection part 111 is formed at the first housing 110 so that a water supply tank 91 or a water service pipe can be connected by tubes (not shown). Also, a coupling part 112 may be fastened to the first housing 110 so that a driving motor 158 of the first flow path control unit 130 can be coupled. One end of the driving motor 158 surface-contacts the coupling part 112 so as to be fixed thereto.

First, second and third chambers 113, 114, and 115 (See FIG. 5) are formed at the discharge side of the first housing 110, and in this case, the number of chambers may be adjusted as necessary. The first, second, and third chambers 113, 114, and 115 may demarcate the interior of the first housing 110 by a partition rib 117 (See FIG. 5), traversing the interior of the first housing 110. In this case, the partition rib 117 may have a 'T'-like shape.

A self-cleansing connection part 101 may be formed at the first chamber 113 to allow water, which has been introduced into the first chamber 114, to be supplied to the nozzle tip cleansing unit 77. The self-cleansing connection part 101 is connected with the water inlet 73a of the nozzle tip cleansing unit 77 by the nozzle tip sterilization pipe 212.

A toilet connection part 102 may be formed at the second chamber 114. The toilet connection part 102 is connected with the toilet sterilization module 250 by the toilet sterilization pipe 222.

The second housing 160 is connected with the third chamber 115 of the first housing 110. An air mixing unit 120 may be connected with the third chamber 115 of the first housing 110. The air mixing unit 120 is connected with an air pump 95 by a tube (not shown).

The air mixing unit 120 is demarcated with the third chamber 115 and connected with the second housing 160. An inlet hole 121 may be formed at the air mixing unit 120 to allow water, which has been introduced into the third chamber 115, to be mixed with air and then discharged to the second housing 160. The air mixing unit 120 may have a tubular shape.

The inlet hole 121 may be formed to correspond to a water inlet side of the third chamber 115. Accordingly, water from the third chamber 115 can be smoothly introduced to the air mixing unit 120 through the inlet hole 121.

The inner space of the air mixing unit 120 is suddenly enlarged at the inlet hole 121, in order that the pressure be dropped at the air mixing unit 120. Thus, a mixture rate of air in the air mixing unit 120 increases drastically. Also, although an air pumping pressure is relatively low, air can be sufficiently mixed with water, so a usage capacity of the air pump 95 can be lowered.

Three or more compartments 161, 162, 163, and 165 may be formed in the interior of the second housing 160. Nozzle connection parts 105, 106, 107, and 108 may be formed at the compartments 161, 162, 163, and 164 in order to connect flow path pipes 201, 202, 203, and 204 that supply water to the cleansing nozzle 37 and the bidet nozzle 75.

For example, four compartments 161, 162, 163, and 164 may be formed in the second housing 160. In this case, cleansing nozzle connection parts 105 and 106 are formed in one pair of compartments 161 and 162, and bidet nozzle connection parts 107 and 108 are formed in the other pair of compartments 163 and 164. In this case, the pair of flow path pipes 201 and 202 may be connected with the cleansing nozzle connection parts 105 and 106 of the pair of compartments 161 and 162, and the other pair of flow path pipes 203 and 204 may be connected with the bidet nozzle connection parts 107 and 108 of the other remaining pair of compartments 163 and 164.

Accordingly, the one pair of compartments 161 and 162 are connected with the linear flow path and the wide flow path of the cleansing nozzle 73, and the other pair of compartments 163 and 164 are connected with the linear flow path and the wide flow path of the bidet nozzle 75.

Also, three compartments may be formed in the interior of the second housing 160. The cleansing nozzle connection part may be formed at a pair of compartments, and the bidet nozzle connection part may be formed at the other remaining one compartment.

In this case, the one pair of compartments may be connected with the linear flow path and the wide flow path, and one compartment may be connected with the linear flow path of the bidet nozzle.

When the three compartments are formed in the interior of the second housing 160, the cleansing nozzle connection part may be formed at the one compartment, and the bidet nozzle connection part may be formed at the other remaining pair of compartments.

The number of formation of the compartments in the second housing 160 may vary depending on the number of flow paths of the cleansing nozzle 73 and the bidet nozzle 75. Hereinafter, the case where the four compartments 161, 162, 163, and 164 are formed in the second housing 160 will be described.

The first housing 110 and the second housing 160 may be disposed to have flow paths having a substantially channel-like shape. Thus, the size of the flow path control device 100 can be reduced.

Of course, the first housing 110 and the second housing 160 may be disposed to have flow paths parallel to each other. In this case, the flow path control device 100 may be longer than the flow path control device 100 having the channel-like shape.

Figure 7:
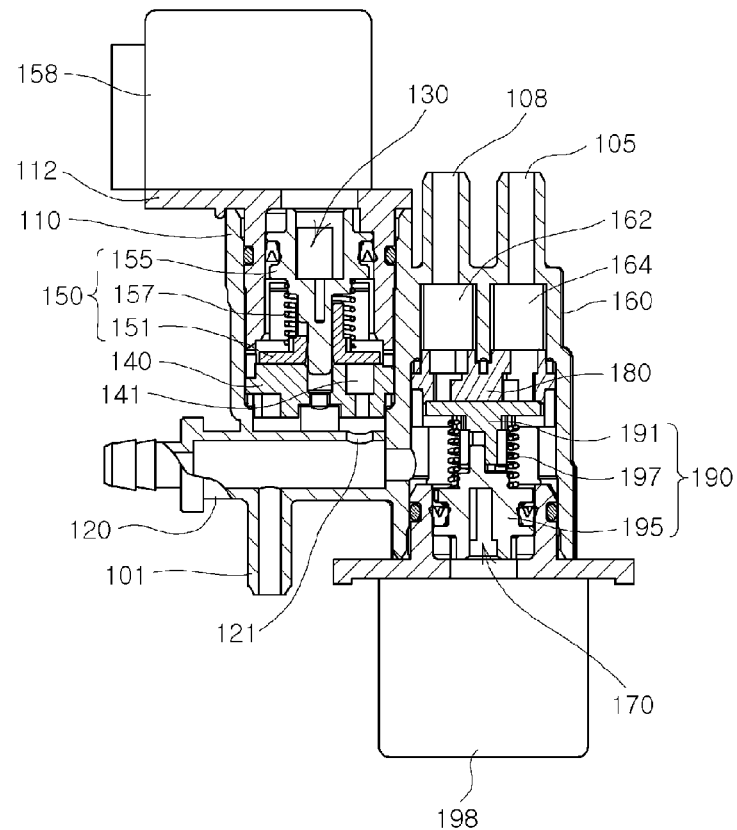
FIG. 7 is a sectional view of the flow path control device of FIG. 4.

FIG. 6 is an exploded perspective view of the flow path control device of FIG. 4, and FIG. 7 is a sectional view of the flow path control device of FIG. 4.

With reference to FIGS. 6 and 7, the first flow path control unit 130 is disposed in the interior of the first housing 110. The first flow path control unit 130 is installed to open some of the first, second, and third chambers 113, 114, and 115 to allow water to be introduced into them.

The first flow path control unit 130 includes a first flow path connection member 140, a first flow path opening and closing member 150, and the driving motor 158.

Three connection holes 141, 143, and 145 are formed at the first flow path connection member 140 such that they correspond to the first, second, and third chambers 113, 114, and 115.

A stopping protrusion 118 (See FIG. 5) is formed at the first housing 110 to support the edges of the first flow path connection member 140. The stopping protrusion 118 supports the edges of the first flow path connection member 140, and the partition rib 117 supports a lower surface of the first flow path connection member 140, whereby, although the water pressure is applied to the first flow path connection member 140, the first flow path connection member 140 can be prevented from being deformed.

A circular annular gasket 147 is installed at the first flow path connection member 140 to seal a gap between the stopping protrusion 118 and the first flow path connection member 140. Also, a cross part 147a is formed to traverse a central portion of the gasket 147 to seal a gap between the first flow path connection member 140 and the partition rib 117. The cross part 147a may be formed have a T-like shape such that it can be in contact with an upper surface of the partition rib 117.

A recess 146 (See FIG. 6) is formed on one surface of the first flow path connection member 140 to allow the cross part 147a of the gasket 147 to be inserted therein.

The first flow path opening and closing member 150 is rotatably installed within the first housing 110 and selectively opens and closes one of the three connection holes 141, 143, and 145.

In this case, the first flow path opening and closing member 150 may include a disk part 151 being in surface-contact with the first flow path connection member 140 and having an opening and closing hole 152 for opening and closing the connection holes 141, 143, and 145, and a rotary part 155 axially coupled to the disk part 151 and the driving motor 158. In this case, the disk part 151 and the rotary part 155 may be detachably coupled.

The first flow path control unit 130 may further include an elastic member 157 in order to tightly attach the disk part 151 of the first flow path opening and closing member 150 to the first flow path connection member 140. In this case, the elastic member 157 may be coupled between the disk part 151 and the rotary part 155 to apply an elastic force to move the disk part 151 and the rotary part 155 apart.

As the driving motor 158, a stepping motor that can precisely adjust a rotational angle may be applied.

The second flow path control unit 170 may be disposed within the second housing 160. The second flow path control unit 170 is installed in the interior of the second housing 160 to open some (one or two) of the four compartments 161, 162, 163, and 164 to allow water to be introduced thereinto.

The second flow path control unit 170 includes a second flow path connection member 180, a second flow path opening and closing member 190, and the driving motor 158.

Four connection holes 181, 182, 183, and 184 are formed at the second flow path connection member 180 such that they correspond to the compartments 161, 162, 163, and 165, respectively.

A stopping protrusion (not shown) may be formed at the second housing 160 in order to support the edges of the second flow path connection member 180. In this case, the second flow path connection member 180 is supported by the stopping protrusion and a cross-like rib 167, so although water pressure is applied to the second flow path connection member 180, the second flow path connection member 180 can be prevented from being deformed.

A circular annular gasket 187 is installed at the second flow path connection member 180 to seal a gap between the stopping protrusion (not shown) and the second flow path connection member 180. Also, a cross part 187a is formed to traverse a central portion of the gasket 187 to seal a gap between the second flow path connection member 180 and the cross-like rib 167.

A cross-like recess 186 (See FIG. 6) is formed on one surface of the second flow path connection member 180 to allow the cross part 187a of the gasket 187 to be inserted therein.

The second flow path opening and closing member 190 is rotatably installed within the second housing 160 and selectively opens and closes some of the four connection holes 181, 182, 183, and 184.

Namely, the second flow path opening and closing member 190 may open a pair of compartments 161 and 162, or one of the compartments, connected with the cleansing nozzle 73. In this case, according to how many of the compartments 161 and 162 are open, a wide water current or linear water current jets from the cleansing nozzle 73.

The second flow path opening and closing member 190 may open a pair of compartments 163 and 164, or one of the compartments, connected with the bidet nozzle 75. In this case, according to how many of the compartments 163 and 164 are open, a wide water current or linear water current jets from the bidet nozzle 75.

In this case, the second flow path opening and closing member 190 may include a disk part 191 being in surface-contact with the second flow path connection member 180 and having an opening and closing hole 192 for opening and closing the connection holes 181, 182, 183, and 184, and a rotary part 195 axially coupled to the disk part 191 and a driving motor 198. In this case, the disk part 191 and the rotary part 195 may be detachably coupled.

The second flow path control unit 170 may further include an elastic member 197 in order to tightly attach the disk part 191 of the second flow path opening and closing member 190 to the second flow path connection member 180. In this case, the elastic member 197 may be coupled between the disk part 191 and the rotary part 195 to apply an elastic force to make the disk part 191 and the rotary part 195 apart.

As the driving motor 198, a stepping motor that can precisely adjust a rotational angle may be applied.

Figure 8:
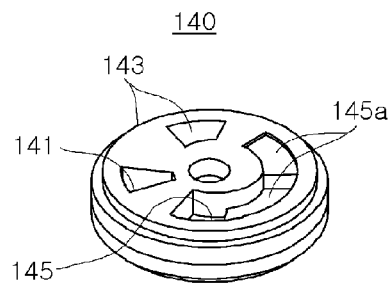
FIG. 8 is a perspective view of a first flow path connection member of FIG. 6.

FIG. 8 is a perspective view of the first flow path connection member.

With reference to FIG. 8, the three connection holes 141, 143, and 145 are formed on the first flow path connection member 140 such that they correspond to the first, second, and third chambers 113, 114, and 115. A step portion 145a may be formed at one side of the connection hole 145 corresponding to the third chamber 115. In this case, the step portion 145a separates the disk part 151 of the first flow path opening and closing member 150 and a contact surface of the first flow path connection member 140 to control a flow amount of water introduced into the third chamber 115.

In this case, when the opening and closing hole 152 of the disk part 151 corresponds to the highest step portion 145a, the smallest amount of water is supplied to the third chamber 115. Also, when the opening and closing hole 152 of the disk 151 corresponds to the connection hole 145, the largest amount of water is supplied to the third chamber 115.

Also, the opening and closing hole 152 of the first flow path opening and closing member 150 may have a size corresponding to one of the connection holes 141, 143, and 145 and the step portion 145a. Namely, the opening and closing hole 152 may correspond to the connection holes 141, 143, and 145, or may correspond to the stop portion 145a.

Figure 9:
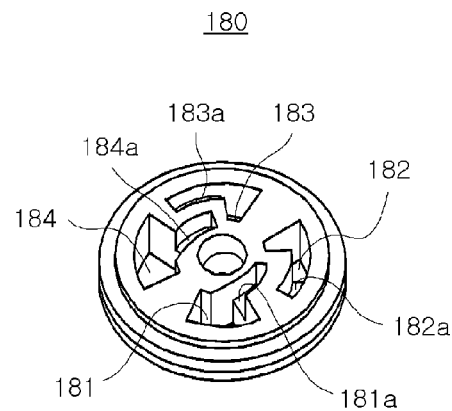
FIG. 9 is a perspective view of a second flow path connection member of FIG. 6.

FIG. 9 is a perspective view of the second flow path connection member.

With reference to FIG. 9, four connection holes 181, 182, 183, and 184 are formed at the second flow path connection member 180 such that they correspond to the compartments 161, 162, 163, and 164. One or more step portions 181a, 182a, 183a, and 184a are formed at one side of the connection holes 181, 182, 183, and 184, respectively, so as to be separated from a contact surface of the disk part 191 of the second flow path opening and closing member 190 to control a flow amount of water introduced into the compartments 161, 162, 163, and 164.

Step portions 191a, 192a, 193a, and 194a may be formed at each pair of connection holes 181, 182, 183, and 184 toward the connection holes of the mutually counterparts. In this case, a pair of connection holes refer to connection holes connected with the same nozzles 73 and 75.

When the opening and closing hole 192 is positioned at each pair of connection holes, water is simultaneously supplied to the linear flow path and the wide flow path of the same nozzles 73 and 75.

The flow path control device 100 includes various flow paths in a single body, simplifying the connection structure of tubes. In addition, an assembling time and fabrication unit cost of the flow path control device 100 can be reduced. Also, when the flow path control device 100 is broken down, the time required for recognizing the connection positions of the respective tubes can be remarkably reduced, and time required for re-assembling the respective tubes can be also significantly reduced.

In addition, because the connection relationships of the tubes of the flow path control device 100 are simple, a part from which water is leaked can be immediately detected.

Also, because the flow path control device 100 is simplified, the bidet may have a simpler installation structure such as ribs or fastening holes. In addition, because the structure of a mold for fabricating the bidet is simplified, a fabrication unit cost of the bidet can be cut.

The operation of the toilet bidet according to an exemplary embodiment of the present invention configured as described above will now be described.

The toilet bidet may perform a cleansing mode, a bidet mode, a nozzle tip cleansing mode, and a toilet sterilization mode. The modes will now be described in turn.

Figure 10:
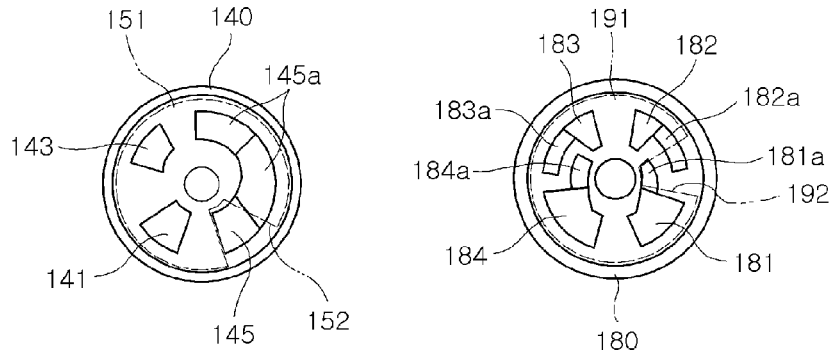
FIG. 10 is a view showing a state in which water is supplied to a linear flow path and a wide flow path of a cleansing nozzle when the toilet bidet of FIG. 4 is operated in a cleansing mode.

FIG. 10 is a view showing a state in which water is supplied to the linear flow path and the wide flow path of the cleansing nozzle when the toilet bidet of is operated in the cleansing mode.

With reference to FIG. 10, when the user selects a wide cleansing button, the nozzle driving device 78 of the nozzle assembly 70 is driven and the cleansing nozzle 73 moves forward. Also, as the water supply pump 91 is actuated, water is supplied to the first housing 110.

Also, as the driving motor 158 of the first flow path control unit 190 is rotated, the opening and closing hole 152 of the disk part 151 opens the connection hole 145 corresponding to the third chamber 115. Then, water of the first housing 110 is introduced into the third chamber 115.

Also, as the air pump 95 is actuated, air is supplied to the air mixing unit 120. At the same time, water in the third chamber 115 is introduced into the air mixing unit 120 through the inlet hole 121 of the air mixing unit 120.

In this case, when water is introduced into the air mixing unit 120 through the inlet hole 121 in the first housing 110, because the space of the air mixing unit 120 is enlarged suddenly, the pressure drops in the air mixing unit 120. Thus, because air is supplied to the air mixing unit 120 in which the water pressure has been lowered, a mixture rate of air in the air mixing unit 120 is drastically increased. The air mixing structure according to an exemplary embodiment of the present invention exhibits an increase of about 20% to 30% compared with an air mixture structure of the related art in which an air tube is connected to a tube between the two-way valve and the four-way valve.

The air-mixed water in the air mixing unit 120 is introduced into the second housing 160. At this time, the driving motor 198 of the second flow path control unit 170 is rotated, so the opening and closing hole 192 of the disk part 191 opens the pair of connection holes 181 and 182 connected with the cleansing nozzle 73 of the second flow path connection member 180. Namely, the opening and closing hole 192 of the disk part 191 simultaneously opens the step portions 181a and 182a formed at one side of the pair of connection holes 181 and 182.

The water which has been introduced into the second housing 160 is supplied, in a state of containing small bubbles, to the linear flow path and the wide flow path of the cleansing nozzle 73. Accordingly, bubble-formed wide water current then jets through the nozzle tip 73b of the cleansing nozzle 73.

Figure 11:
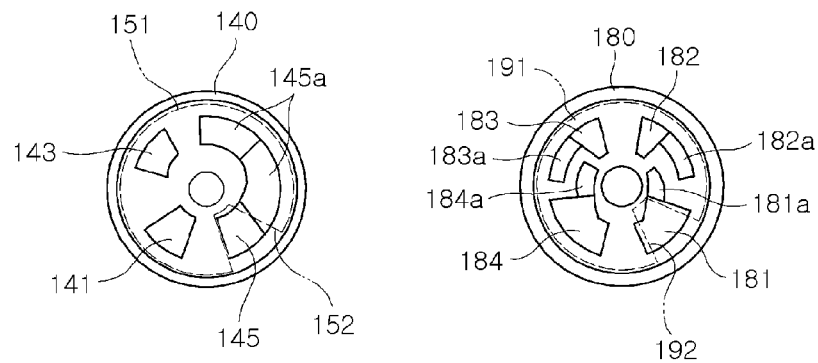
FIG. 11 is a view showing a state in which water is supplied only to the linear flow path of the cleansing nozzle when the toilet bidet of FIG. 4 is operated in the cleansing mode.

FIG. 11 is a view showing a state in which water is supplied only to the linear flow path of the cleansing nozzle when the toilet bidet is operated in the cleansing mode.

With reference to FIG. 11, when the user selects a linear cleansing button, the nozzle driving device 78 of the nozzle assembly 70 is driven and the cleansing nozzle 73 moves forward. Also, as the water supply pump 91 is actuated, water is supplied to the first housing 110.

Also, as the driving motor 158 of the first flow path control unit 190 is rotated, the opening and closing hole 152 of the disk part 151 opens the connection hole 145 corresponding to the third chamber 115. Then, water from the first housing 110 is introduced into the third chamber 115.

Also, as the air pump 95 is actuated, air is supplied to the air mixing unit 120. At the same time, water in the third chamber 115 is introduced into the air mixing unit 120 through the inlet hole 121 of the air mixing unit 120. At this time, a mixture rate of air increases drastically due to a pressure drop in the air mixing unit 120. The air-mixed water in the air mixing unit 120 is introduced into the second housing 160.

As the driving motor 198 of the second flow path control unit 170 is rotated, the opening and closing hole 192 of the disk 191 opens the connection hole 181 corresponding to the linear flow path of the cleansing nozzle 73 of the second flow path connection member 180. Namely, the opening and closing hole 192 of the disk 191 opens only the single connection hole 181 corresponding to the linear flow path.

The water which has been introduced into the second housing 160 is supplied, in a state of containing small bubbles, to the linear flow path of the cleansing nozzle 73. Accordingly, a bubble-formed linear water current then jets through the nozzle tip 73b of the cleansing nozzle 73.

Figure 12:
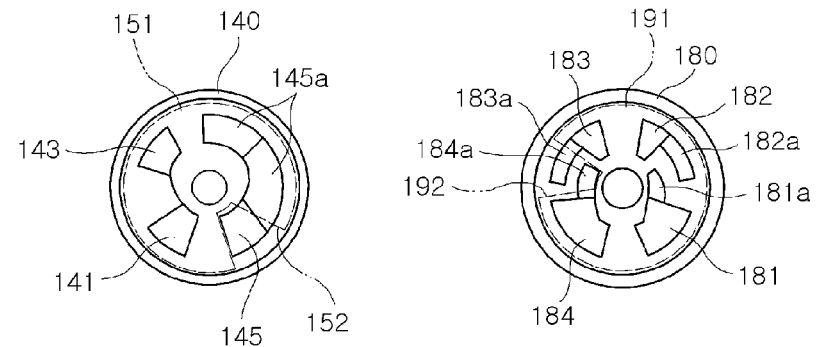
FIG. 12 is a view showing a state in which water is supplied to a linear flow path and a wide flow path of a bidet nozzle when the toilet bidet of FIG. 4 is operated in a bidet mode.

FIG. 12 is a view showing a state in which water is supplied to the linear flow path and the wide flow path of the bidet nozzle when the toilet bidet is operated in a bidet mode.

With reference to FIG. 12, when the user selects a wide bidet button, the nozzle driving device 78 of the nozzle assembly 70 is driven and the cleansing nozzle 73 moves forward. Also, as the water supply pump 91 is actuated, water is supplied to the first housing 110.

Also, as the driving motor 158 of the first flow path control unit 190 is rotated, the opening and closing hole 152 of the disk 151 opens the connection hole 145 corresponding to the third chamber 115. Then, water of the first housing 110 is introduced into the third chamber 115.

Also, as the air pump 95 is actuated, air is supplied to the air mixing unit 120. At the same time, water in the third chamber 115 is introduced into the air mixing unit 120 through the inlet hole 121 of the air mixing unit 120. At this time, a mixture rate of air increases drastically due to a pressure drop in the air mixing unit 120. The air-mixed water in the air mixing unit 120 is introduced into the second housing 160.

As the driving motor 198 of the second flow path control unit 170 is rotated, the opening and closing hole 192 of the disk 191 opens the connection holes 183 and 184 corresponding to the linear flow path and the wide flow path of the bidet nozzle 75 of the second flow path connection member 180.

The water which has been introduced into the second housing 160 is supplied, in a state of containing small bubbles, to the linear flow path and the wide flow path of the bidet nozzle 75. Accordingly, a bubble-formed wide water current then jets through the nozzle tip 75b of the bidet nozzle 75.

Figure 13:
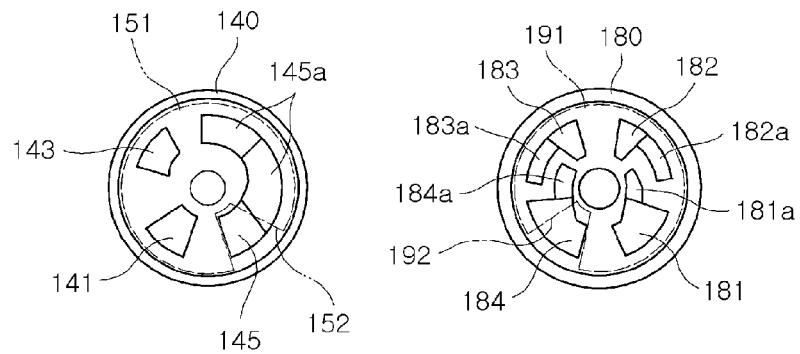
FIG. 13 is a view showing a state in which water is supplied only to the linear flow path of the bidet nozzle when the toilet bidet of FIG. 4 is operated in the bidet mode.

FIG. 13 is a view showing a state in which water is supplied only to the linear flow path of the bidet nozzle when the toilet bidet is operated in the bidet mode.

With reference to FIG. 13, when the user selects a linear water current bidet button, the nozzle driving device 78 of the nozzle assembly 70 is driven and the cleansing nozzle 73 moves forward. Also, as the water supply pump 91 is actuated, water is supplied to the first housing 110.

Also, as the driving motor 158 of the first flow path control unit 190 is rotated, the opening and closing hole 152 of the disk 151 opens the connection hole 145 corresponding to the third chamber 115. Then, water of the first housing 110 is introduced into the third chamber 115.

Also, as the air pump 95 is actuated, air is supplied to the air mixing unit 120. At the same time, water in the third chamber 115 is introduced into the air mixing unit 120 through the inlet hole 121 of the air mixing unit 120. At this time, a mixture rate of air increases drastically due to a pressure drop in the air mixing unit 120. The air-mixed water in the air mixing unit 120 is introduced into the second housing 160.

As the driving motor 198 of the second flow path control unit 170 is rotated, the opening and closing hole 192 of the disk 191 opens only the connection hole 184 corresponding to the linear flow path of the bidet nozzle 75 of the second flow path connection member 180.

The water which has been introduced into the second housing 160 is supplied, in a state of containing small bubbles, to the linear flow path of the bidet nozzle 75. Accordingly, a bubble-formed linear water current then jets through the nozzle tip 75b of the bidet nozzle 75.

After the cleansing nozzle 73 or the bidet nozzle 75 are retreated to their original position, in order to remove filth (or soil) from the nozzle tips 73b and 75b of the cleansing nozzle 73 and the bidet nozzle 75, the nozzle tips 73b and 75b are sterilized.

Figure 14:
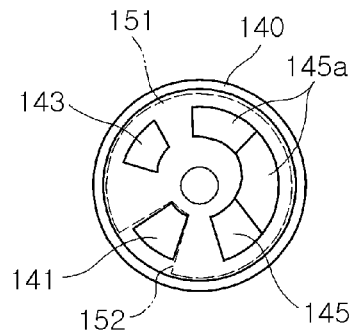
FIG. 14 is a view showing a state in which water is supplied to a nozzle tip cleansing unit when the toilet bidet of FIG. 4 is operated in a nozzle tip cleansing mode.

FIG. 2 illustrates the configuration of a sterilization system, and FIG. 14 is a view showing a state in which water is supplied to the nozzle tip cleansing unit when the toilet bidet is operated in a nozzle tip cleansing mode.

With reference to FIGS. 2 and 14, as the driving motor 158 of the first flow path control unit 130 is rotated, the opening hole 152 of the disk 151 opens the connection hole 141 corresponding to the first chamber 113.

At this time, water in the water supply tank 90 or the water service pipe is introduced into the first housing 110 and then flows along the nozzle tip connection pipes 211 and 212 (See FIG. 2). At this time, the water in the connection pipes 221 is introduced into the sterilization water module 230.

The water which has been supplied to the sterilization water module 230 contains various ions and Cl-ions. For example, the water supplied to the sterilization water module 230 may comprise Cl-ion of about 100 ppm. Here, the content of Cl-ions may vary according to various rules or regulations regarding tap water, water temperature, water pressure, and the like.

As voltage is supplied to the electrode of the sterilization water module 230, electricity is applied to water. The, the Cl-ions are reduced to $Cl_2$ on the surface of the electrode of the sterilization water module 230. If there are Cl-ions of 100 ppm in water of the sterilization water module 230, water to which electricity has been applied contains $Cl_2$ of about 5 ppm to 80 ppm and OCl- or HOCl-ions of about 0.5 ppm to 10 ppm may be ionized. Accordingly, the concentration of OCl-ions and HOCl-ions may vary depending on the amount of dissolved Cl-ions, water temperature, water volume, pH, etc.

The HOCl-ions and OCl-ions perform sterilization, so hereinafter, the water mixed with HOCl-ions and OCl-ions will be called sterilization water.

The sterilization water is supplied to the nozzle tip cleansing unit 77 through the connection pipe 221. The nozzle tip cleansing unit 77 injects water to the nozzle tips 73b and 75b to cleanse them. Because the sterilization area of the nozzle tips 73b and 75 is small, they can be sufficiently sterilized only with the HOCl-ions and OCl-ions generated from the sterilization water module 230.

Meanwhile, the air pump 95 is paused, not supplying air to the air mixing unit 120. Also, the second and third chambers 114 and 115 are closed by the flow path control unit 130, so water is not supplied to the second housing 160.

Next, the surface of the toilet 10 may be contaminated by defecation or urination. Thus, the toilet bidet may perform a toilet sterilization mode for sterilizing the toilet 10 as the user presses a selection button or periodically.

Figure 15:
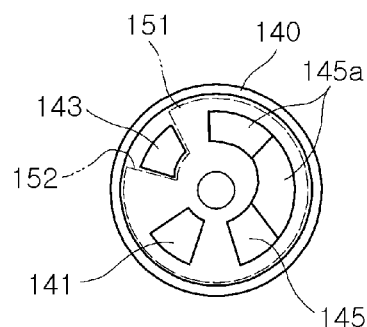
FIG. 15 is a view showing a state in which water is supplied to the toilet when the toilet bidet of FIG. 4 is operated in a toilet cleansing mode.

FIG. 2 illustrates the configuration of the sterilization system and FIG. 15 is a view showing a state in which water is supplied to the toilet when the toilet bidet is operated in a toilet cleansing mode.

With reference to FIGS. 2 and 15, as the driving motor 158 of the first flow path control unit 130 is rotated, the opening hole 152 of the disk 151 opens the connection hole 141 corresponding to the first chamber 113.

At this time, water in the water supply tank 90 or the water service pipe is introduced into the first housing 110 and then flows along the direct water supply pipe 211 (See FIG. 2). The water in the connection pipes 221 is introduced into the reactant adding module 240.

The water which has been supplied to the reactant adding module 240 dissolves a reactant accommodated in the reactant adding module 240. At this time, as the reactant is dissolved in the water, the concentration of Cl-ions existing in the water can increase drastically.

The dissolution speed of the reactant may be properly adjusted by regulating the density of the reactant or the degree at which the reactant is exposed to water.

The water containing the reactant in the reactant adding module 240 is introduced into the sterilization water module 230 through the direct water supply pipe 211. When voltage is supplied to the electrode in the toilet sterilization module 250, electricity is applied to the water. Then, Cl-ions on the surface of the electrode of the toilet sterilization module 250 are reduced to $Cl_2$.

For example, if there are Cl-ions of 100,000 ppm in water of the toilet sterilization module 250, water to which electricity has been applied contains dissolved $Cl_2$ of about 5,000 ppm, and HOCl-ions or OCl-ions of about 500 ppm may be ionized. Thus, compared to the case in which HOCl-ions or OCl-ions are ionized by simply applying electricity to tap water, the amount of dissolved HOCl-ions or OCl-ions, the sterilization material, can increase 1000-fold.

The sterilization water is supplied to the toilet sterilization module 250 through the direct water supply pipe 211. The toilet sterilization module 250 injects the sterilization water to the surface of the toilet 10 to sterilize it.

In this case, even if the sterilization area of the toilet 10 is large compared with the nozzle tips, because the amount of HOCl-ions or OCl-ions generated by the toilet sterilization module 250 increases significantly, the toilet 10 can be sufficiently sterilized.

Also, because the sterilization water jets in the form of droplet from the toilet sterilization module 250, the surface of the toilet 10 can be sufficiently sterilized even with a small amount of sterilization water.

Meanwhile, the air pump 95 is paused, not supplying air to the air mixing unit 120. Also, because the second and third chambers 114 and 115 are closed by the flow path control unit 130, water is not supplied to the second housing 160.

In this manner, because water and the sterilization water flow in different paths to sterilize the nozzle tips 73b and 75b and the toilet 10, the nozzle tips 73b and 75b and the toilet 10, having different sterilization areas, can be properly sterilized.

A sterilization system according to a second exemplary embodiment of the present invention will now be described.

Figure 16:
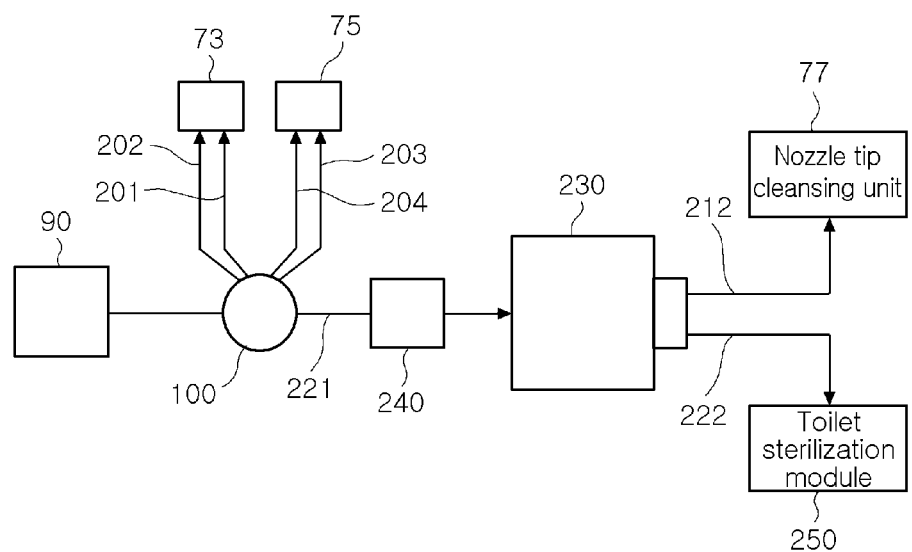
FIG. 16 shows the configuration of a sterilization system constituting the toilet bidet according to a second exemplary embodiment of the present invention.

FIG. 16 shows the configuration of a sterilization system constituting the toilet bidet according to a second exemplary embodiment of the present invention. In describing the sterilization system according to the second exemplary embodiment of the present invention, the same reference numerals are used for the same elements as those of the first exemplary embodiment and a description thereof will be omitted.

With reference to FIG. 16, in the second exemplary embodiment of the present invention, the flow path control device 100 and the sterilization water module 230 are connected by the connection pipe 221, and the reactant adding module 240 is installed at the connection pipe 221.

In this case, in the second exemplary embodiment of the present invention, the direct water supply pipe 211 (See FIG. 2) is not connected between the flow path control device 100 and the sterilization water module 230. Also, because the direct water supply pipe 211 (See FIG. 2) is omitted, the first chamber 113 (See FIG. 5) connected with the direct water supply pipe 211 may not be formed in the flow path control device 100. Also, only two chambers 114 and 115 may be formed at the first housing 110 (See FIG. 5) of the flow path control device 100.

In the foregoing sterilization system, water discharged from the flow path control device 100 is introduced into the sterilization water module 230 always by way of the reactant adding module 140. Thus, because water always containing a reactant is introduced into the sterilization water module 230, when electricity is applied to the water of the sterilization water module 230, the generation amount of HOCl-ions or OCl-ions, the sterilization material, increases considerably in the water. Thus, sterilization water having considerably increased sterilizing power can be provided to the nozzle tip cleansing unit 77 and the toilet sterilization module 250, thus improving the sterilization performance.

A modification of the present invention will now be described.

Figure 17:
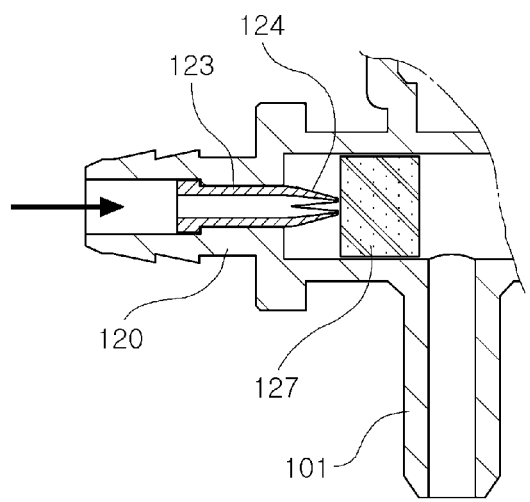
FIG. 17 is a sectional view of an air mixing unit according to a modification of the present invention.

FIG. 17 is a sectional view of an air mixing unit according to a modification of the present invention. Other than the air mixing unit 120, the configuration is the same as that of the flow path control device described above with reference to FIGS. 4 to 7.

As shown in FIG. 17, the air mixing unit 120, according to the modification of the present invention, includes an air tube 123 having a form narrowing toward an end portion of a discharge side 124 thereof, and the discharge side of the air tube 123 may have a conical shape.

The air tube 123 may be made of a flexible material so as to be open and closed by pneumatic pressure. The air tube 123 may be made of a material such as latex rubber.

The air mixing unit 120 includes a space part formed near the discharge side of the air tube 123. Thus, the discharge side 124 of the air tube 123 may be open by pneumatic pressure.

Also, the air mixing unit 120 may further include a porous member 127 disposed at the air discharge side of the air tube 123 to allow air to pass therethrough. As the porous member 127, a sponge or a mesh may be applied.

The porous member 127 allows air spread with a uniform pressure, thus preventing the generation of noise when air is mixed with water. Also, as an air discharge area increases, a mixture rate of air to water can be increased, so a soft water current having rich bubbles can be formed.

INDUSTRIAL APPLICABILITY

According to the present invention, the structure of the toilet bidet can be simplified, assembling and separation can be facilitated, and the concentration of a sterilization material can be adjusted to sterilize the nozzle tips and the toilet.

The invention claimed is:

1. A toilet bidet, comprising:
    a flow path control device comprising:
        a first housing including two or more demarcated chambers;
        a first flow path control unit disposed at the interior of the first housing and selectively opening one of the two or more chambers to allow water to be introduced into the chamber;
        a second housing positioned adjacent to the first housing and connected with one of the chambers of the first housing, and including three or more compartments connected with a bidet nozzle and a cleansing nozzle; and
        a second flow path control unit disposed at the interior of the second housing and selectively opening some of the three or more compartments to allow water to flow thereinto; and
    a sterilization water module providing sterilization water;
    a connection pipe connected with a discharge side flow path of the flow path control device;
    a nozzle tip sterilization pipe connected with the connection pipe and the nozzle tip cleansing unit; and
    a toilet sterilization pipe connected with the connection pipe and a toilet sterilization module,
    wherein the nozzle tip sterilization pipe and the toilet sterilization pipe is supplied with sterilization water formed by the sterilization water module,
    wherein the first flow path control unit comprises:
        a first flow path connection member coupled with an inlet side of the first housing and having connection holes formed to correspond to the two or more chambers, respectively;
        a first flow path opening and closing member rotatably installed at the interior of the first housing and selectively opening and closing one of the connection holes; and
        a driving motor rotating the first flow path opening and closing member.

2. The toilet bidet of claim 1, wherein the sterilization water module is connected with the connection pipe and generates sterilization water by ionizing water discharged from the connection pipe by applying electricity thereto.

3. The toilet bidet of claim 2, further comprising:
    a reactant adding module connected with the connection pipe and adding a reactant to water flowing to the sterilization water module to allow the sterilization water module to increase the amount of generation of a sterilization material.

4. The toilet bidet of claim 3, wherein the reactant is NaCl or NaClO2, and the reactant is accommodated in the reactant adding module such that the reactant is exposed to water.

5. The toilet bidet of claim 2, further comprising:
    a direct water supply pipe connecting the flow path control device and the sterilization water module.

6. The toilet bidet of claim 1, further comprising:
an air mixing unit connected with the chamber of the first housing to which the second housing is connected, and mixing air with water introduced into the chamber as the chamber is open by an air pressure.

7. The toilet bidet of claim 6, wherein the air mixing unit comprises a porous member disposed at an air discharge side of an air tube to allow air to pass therethrough.

8. The toilet bidet of claim 7, wherein the porous member has a form of a sponge or mesh.

9. The toilet bidet of claim 1, wherein the second flow path control unit
comprises:
- a second flow path connection member coupled with an inlet side of the second housing and having connection holes formed to correspond to each compartment, respectively;
- a second flow path opening and closing member rotatably installed at the interior of the second housing and selectively opening and closing some of the connection holes; and
- a driving motor rotating the second flow path opening and closing member.

\* \* \* \* \*